US000001425H

United States Statutory Invention Registration [19]

[11] Reg. Number: H1425

Wolter

[43] Published: Apr. 4, 1995

[54] HEAD SUSPENSION ASSEMBLY HAVING IMPROVED FREQUENCY RESPONSE, ACCURATE HEAD POSITIONING AND MINIMIZED FLYING VARIATION

[76] Inventor: Raymond R. Wolter, 312 Lake St., Hutchinson, Minn. 55350

[21] Appl. No.: 125,416

[22] Filed: Sep. 22, 1993

[51] Int. Cl.[6] ..... G11B 5/48; G11B 21/16

[52] U.S. Cl. ..... 360/104; 360/103; 360/105

[58] Field of Search ..... 360/104, 103, 105

[56] References Cited

U.S. PATENT DOCUMENTS

| | | | |
|---|---|---|---|
| 3,931,641 | 1/1976 | Watrous | 360/104 |
| 4,167,765 | 9/1979 | Watrous | 360/103 |
| 4,992,898 | 2/1991 | Wanlass | 360/104 |
| 5,172,286 | 12/1992 | Jurgenson | 360/104 |
| 5,198,945 | 3/1993 | Blaeser et al. | 360/104 |
| 5,282,103 | 1/1994 | Hatch et al. | 360/103 |

FOREIGN PATENT DOCUMENTS

| | | | |
|---|---|---|---|
| 92/013345 | 8/1992 | WIPO | 360/104 |
| 92/020066 | 11/1992 | WIPO | 360/104 |

OTHER PUBLICATIONS

Type 16 Suspension Product Summary, Hutchinson Technology, Jul. 15, 1991.

*Primary Examiner*—Bernarr E. Gregory

[57] ABSTRACT

A load beam is joined by its proximal end to a rigid actuator arm. The load beam has stiffening flanges projecting from its longitudinal edges. The flanges have a Z-axis measurement or height of at most about 0.4 mm. The flanges terminate co-extensive with the load beam surface. The distal end of the load beam has a load bearing dimple with a Z-axis height of at least about 0.10 mm. The flexure is attached to a distal end of the load beam. The load beam distal end may be narrower than the flexure. Longitudinal load beam edges in the base plate region may have a rail or tabs for supporting head connection. The load beam spring region may have a central area of reduced thickness. The load beam may have alignment and assembly tooling features. The flexure and the actuator base plate may be welded to the load beam, or the mounting arm and the load beam may be a unitary one-piece structure. Each flange may have a U-shaped or V-shaped cross-sectional profile, or each flange may taper from a minimum depth at a load beam proximal end to a maximum depth at a load beam distal end. The flexure may have areas of reduced thickness on the flexure arms.

24 Claims, 9 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HEAD SUSPENSION ASSEMBLY HAVING IMPROVED FREQUENCY RESPONSE, ACCURATE HEAD POSITIONING AND MINIMIZED FLYING VARIATION

FIELD OF THE INVENTION

This invention relates to an improved head suspension assembly (HSA) for use in dynamic storage devices or rigid disk drives. More particularly, the present invention provides specific improvements to the construction and assembly of the various components of an HSA to provide a suspension of intermediate length with decreased pitch and roll stillnesses, in order to decrease sensitivity of the HSA to fly height and drive assembly tolerances.

BACKGROUND OF THE INVENTION

In a magnetic rigid disk storage device, a rotating disk is employed to store information in small magnetized domains located on the disk surface. By providing advanced mechanisms to accurately and rapidly record-/retrieve data to/from these domains, a large quantity of information can conveniently be manipulated in a small physical volume.

Rigid disk storage devices typically include a frame to provide attachment points and orientation for other components, and a spindle motor mounted to the frame for rotating the disk. A magnetic read/write head capable of flying in close proximity to the rigid disk(s) enables the creation of the magnetic domains on the disk. The head is supported and properly oriented in relationship to the disk by a head suspension assembly which provides forces and compliances necessary for proper transducer operation. The suspension assembly and head are driven and positioned with respect to the disk by an actuator mounted to the frame.

A typical head suspension assembly (HSA) includes an elongated load beam, an actuator plate attached to a proximal end of the load beam for mounting the load beam to an actuator arm of a disk drive, and a gimballing flexure at a distal end of the load beam. A head slider is mounted to the flexure and thereby supported in read/write orientation with respect to an associated disk. Rails or flanges extend generally longitudinally along the load beam to add rigidity and provide routing for wire leads extending from the head slider. Commonly assigned U.S. Pat. No. 5,198,945, MAGNETIC HEAD SUSPENSION, issued Mar. 30, 1993, describes load beam transitional side rails or flanges, which gradually progress from a minimum Z-axis depth (that is, minimum height) at a proximal end of the load beam (adjacent to the rigid arm) to a maximum Z-axis depth (that is, maximum height) at a load beam distal end to provide increased loading clearance and increased disk to suspension clearance to facilitate lifting of the proximal end of the load beam.

On the load beam, between the distal end of the actuator plate and the proximal end of the rails or flanges, is an area of flexibility referred to as the spring region. Manufacturers and designers of such magnetic disk drives are continually looking for ways to increase storage capacity while maintaining specific form factors (i.e., component sizes and dimensional relationships) for disk drive design. Improved resonance performance of the suspension, through higher resonant frequencies and lower gains for off track modes, allows for the utilization of a higher number of data tracks per centimeter on the disk. A higher areal density and more data storage per disk surface can thereby be obtained.

The general design of an HSA flexure allows the head to pitch about a first axis, generally oriented longitudinally with respect to the suspension, and roll about a second or transverse axis, perpendicular to the first axis, when imperfections in the disk drive assembly tend to place the head in improper positions relative to the surface of the disk.

Also described in U.S. Pat. No. 5,198,945 are tooling features on the load beam, such as at the proximal end of the load beam or just proximal of a distal end of the load beam, to facilitate accurate angular placement in alignment and assembly of the suspension.

A specific prior HSA, available from the assignee of the present invention and designated the Type 16, is designed for use with a 50% slider. The Type 16 requires that the Z-axis tolerance be held to +/−0.12 mm. However, there is a continuing need for improvements in HSAs which would allow increased Z-axis tolerance.

Although certain features of the present invention are separately found in conventional HSAs, the particular combination of features of the HSAs of the present disclosure has not previously been suggested to be associated in a single HSA, and the present combination offers specific unobvious and improved advantages in performance that are not obtainable with currently available HSAs.

SUMMARY OF THE INVENTION

In a head suspension assembly for attachment to a rigid actuator arm, the head suspension comprises in combination a spring load beam element and a gimballing flexure having the following structural features.

The load beam is joined by its proximal end to the rigid actuator arm. The load beam has stiffening flanges projecting from longitudinal load beam edges. The flanges have a positive depth with a maximum Z-axis depth measurement or height of at most about 0.4 mm from the load beam surface. The flanges terminate coextensive on the Z-axis with the load beam surface. The distal end of load beam element has a load bearing dimple. The dimple has a minimum Z-axis height of at least about 0.10 mm from the surface of the load beam to which a flexure means is attached. The flexure means is provided at a distal end of the load beam element.

Additional features which can be incorporated into the HSAs of this invention are as follows. The load beam may have one or more apertures to allow ultraviolet curing of an epoxy adhesive bonding the read/write head to the flexure. The width of the load beam distal end may be less than the width of the flexure to allow visibility of and access to the magnetic read/write head bonded to the flexure. The narrowness of the load beam distal end relative to the flexure also facilitates head bonding, location, inspection and measurement, and facilitates visibility of and access to interconnection means from the head.

Longitudinal load beam edges in the base plate region may have a means for supporting read-write head connection means, such as a longitudinal rail or supporting tabs. The load beam spring region may have a central area of reduced thickness. The load beam may have tooling features, such as at the proximal end of the load beam or just proximal of a distal end of the load beam, to facilitate accurate angular placement in alignment and assembly of the suspension.

In order to provide a greater dimple height, the dimple is formed in the load beam, rather than in the flexure, as has previously been conventional. The load beam is formed of thicker sheet material than the flexure, thus allowing the formation of a higher dimple.

The flexure and the actuator base plate may be welded to the load beam. Alternatively, the actuator base plate may be eliminated, and the mounting arm and the load beam may together be a unitary one-piece structure etched out of the same sheet of material.

Each flange may have a U-shaped or V-shaped cross-sectional profile, or each flange may be of a transitional depth having a minimum depth at a load beam proximal end and a maximum depth at a load beam distal end.

The flexure may have areas of reduced thickness, for example, on the flexure flexible arms.

DETAILED DESCRIPTION OF THE INVENTION

Figure 1:
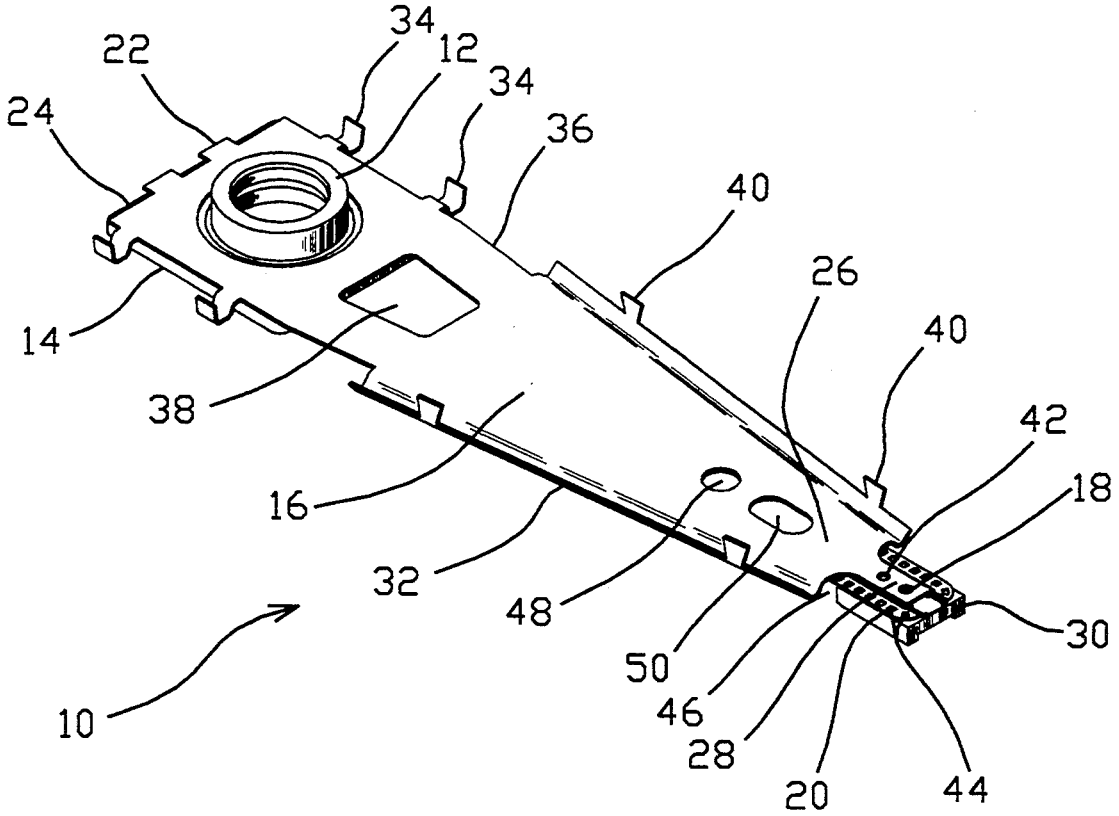
FIG. 1 is a perspective view of a head suspension assembly according to the teachings of the present invention.
Figure 2:
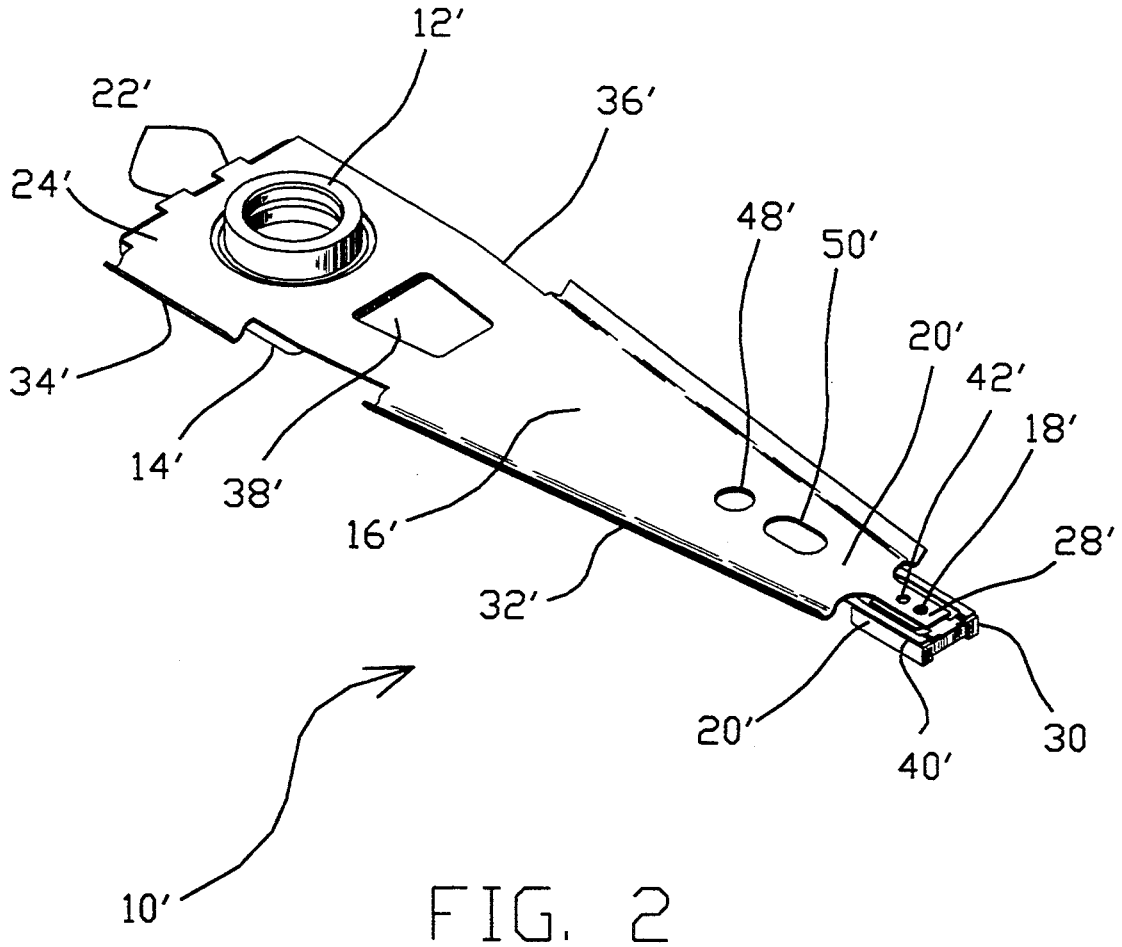
FIG. 2 is a perspective view of another head suspension assembly also according to the teachings of the present invention.

Referring now to the drawings, FIGS. 1 and 2 illustrate two embodiments of a head suspension assembly 10, 10' formed in accordance with the teachings of this invention. The head suspension assemblies according to this invention are generally of the type referred to as a Watrous suspension system, such as described in U.S. Pat. Nos. 3,931,641 and 4,167,765. Reference is made to these two patents for a more detailed discussion of the structure and use of Watrous suspension systems and disk drive systems generally.

Suspension 10, 10' is mounted on a rigid actuator arm of a magnetic disk drive (not shown) using swaging boss 12, 12' which projects upwardly from base plate 14, 14' positioned against lower planar surface of load beam 16, 16'. U.S. Pat. No. 5,172,286, issued Dec. 15, 1992 and entitled LOAD BEAM INTERLOCKING BOSS, describes a mounting assembly for attaching a head suspension assembly to a rigid actuator arm, and this assembly may advantageously be used in mounting the present novel HSAs. If desired, other base plate structures and methods of attachment can be utilized for securing the load beam 16, 16' to the rigid actuator arm employing any known suitable connecting means such as screws, welding, swaging or bonding.

As shown in FIGS. 1 and 2, a load bearing dimple 18, 18' is formed in a distal portion of the load beam 16, 16' for confronting the flexure 20, 20'. According to the present invention, load beam 16, 16'is generally formed from a sheet of stainless steel, preferably a 300 series alloy, having a nominal sheet thickness of between about 0.05 to 0.10 mm. This is significantly thicker than the sheet material used in the flexure 20, 20', where the load bearing dimple is conventionally formed. The sheet material from which the flexure 20, 20' is formed has a nominal thickness between about 0.025 and 0.050 mm. The thicker material allows forming of higher height load bearing dimple 18, 18' in a distal portion of load beam 16, 16' than has previously been possible when the dimple is formed in the flexure. The ability to provide a broader range of dimple heights and higher dimple heights allows HSAs according to the present invention to be able to fit into a larger range of disk-to-disk spacings.

The width of the proximal end 24, 24' of load beam 16, 16', adjacent to the rigid actuator arm, is approximately equal to the actuator arm width. The proximal end 24, 24' of load beam 16, 16' as illustrated in FIGS. 1 and 2, is provided with a tooling feature to facilitate accurate angular placement in suspension alignment, that is, proximally extending tabs 22, 22'. Load beam 16, 16' width then tapers to a second narrower width at the load beam distal portion 26, 26', and then abruptly reduces to a nose end 28, 28' third narrowest constricted width of between about 0.5 to about 1.25 mm. This narrowest nose end 28, 28' of load beam 16, 16' allows increased visibility of and access to the attached flexure 20, 20' and read/write head 30 to facilitate such procedures as bonding, location, inspection and measurement. Increased visibility of and access to sides and distal end of the head 30 further allow for easier routing of interconnection means from the head 30, to be routed along the load beam 16, 16', preferably along perimeter flanges 32, 32' and along support means 34, 34' provided at a proximal end 24, 24' of the load beam 16, 16' in the region of the base plate 14, 14'. In addition, increased head exposure provided by the constricted nose end 28, 28' of the load beam 16, 16' permits the head 30 to access tracks closer in to the disk hub, thus decreasing the number of accessible tracks lost with previous wider HSAs.

The portion of load beam 16, 16' adjacent to base plate 14, 14' referred to as the spring region 36, 36', is resilient, while the remaining length of the load beam 16, 16' is substantially rigid. Resiliency is preferably enhanced by having a central area 38, 38' in the spring region 36, 36' of reduced thickness. This central area 38, 38' of reduced thickness reduces load beam spring rate.

The central area 38, 38' is an area of partial thickness(es) or an aperture through the load beam material.

The rigidity of the remaining length of load beam 16, 16' is enhanced by stiffening flanges or rails 32, 32' which project toward the side of the load beam 16, 16' to which the flexure 20, 20' and the read/write head 30 are to be attached. The flanges 32, 32' are alternatively be formed to project away from the side of the load beam 16, 16' to which the read/write head 30 is to be bonded. The flanges 32, 32' for HSAs of the present invention have a positive depth with a maximum Z-axis measurement or height of at most about 0.4 mm from a surface of the load beam 16, 16', and the flanges terminate co-extensive on a Z-axis with the opposing surface of the load beam 16, 16'. This flange depth is much less than in previously available HSAs, and increases the back-to-back suspension distance to increase disk-to-head loading clearance. When the flanges 32 have capture tabs 40, as shown in FIG. 1, the flanges 32 are so formed that the tabs 40 terminate co-extensive on a Z-axis with the planar surface of the load beam 16.

Figure 3:
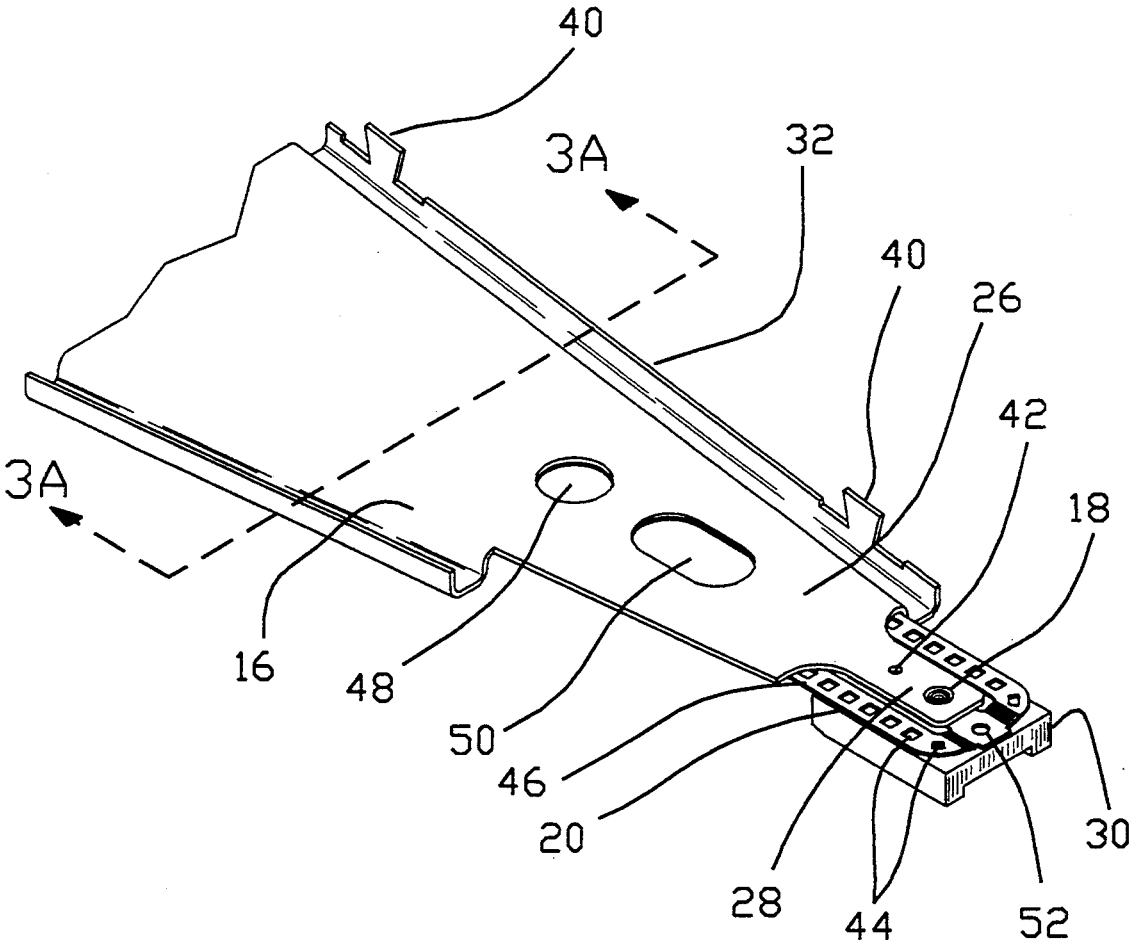
FIG. 3 is a partial perspective view of a head suspension assembly, similar to that shown in FIG. 1, showing one of the flanges cut-away.
Figure 3A:
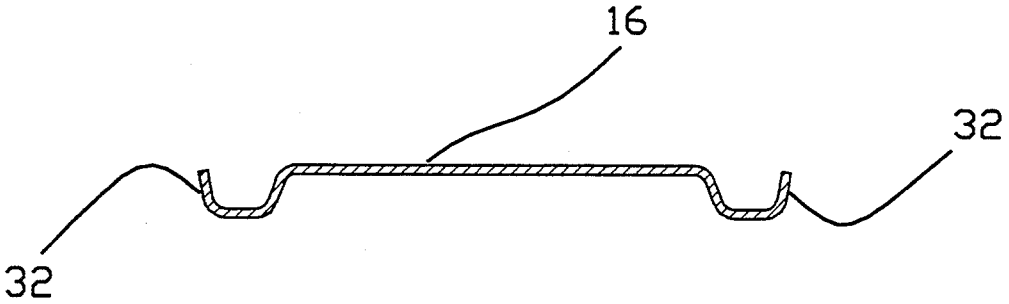
FIG. 3A shows a cross-sectional view, taken along the line A—A of FIG. 3, of a flange having a U-shaped profile.
Figure 4:
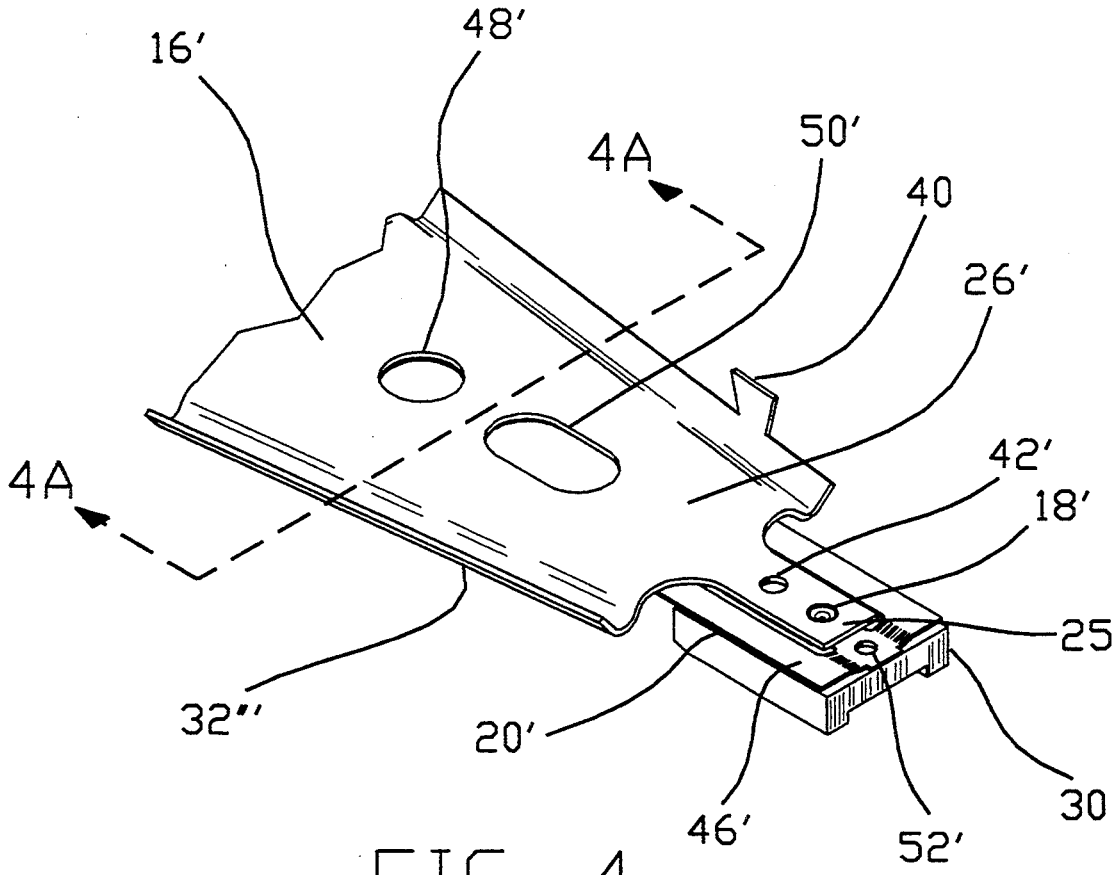
FIG. 4 is a partial perspective view of a head suspension assembly, similar to that shown in FIG. 2, showing an aperture in the distal end of the flexure.
Figure 4A:
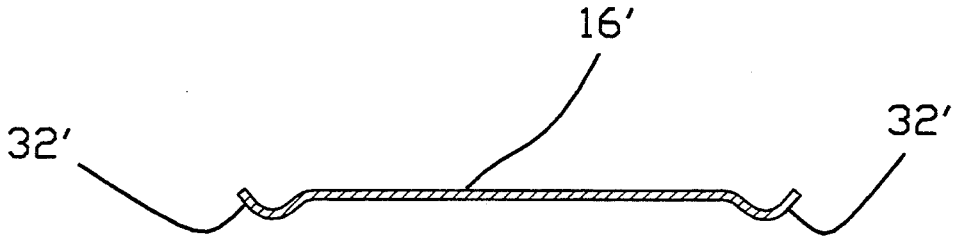
FIG. 4A shows a cross-sectional view, taken along line A—A of FIG. 4, of a flange having a V-shaped profile.
Figure 6:
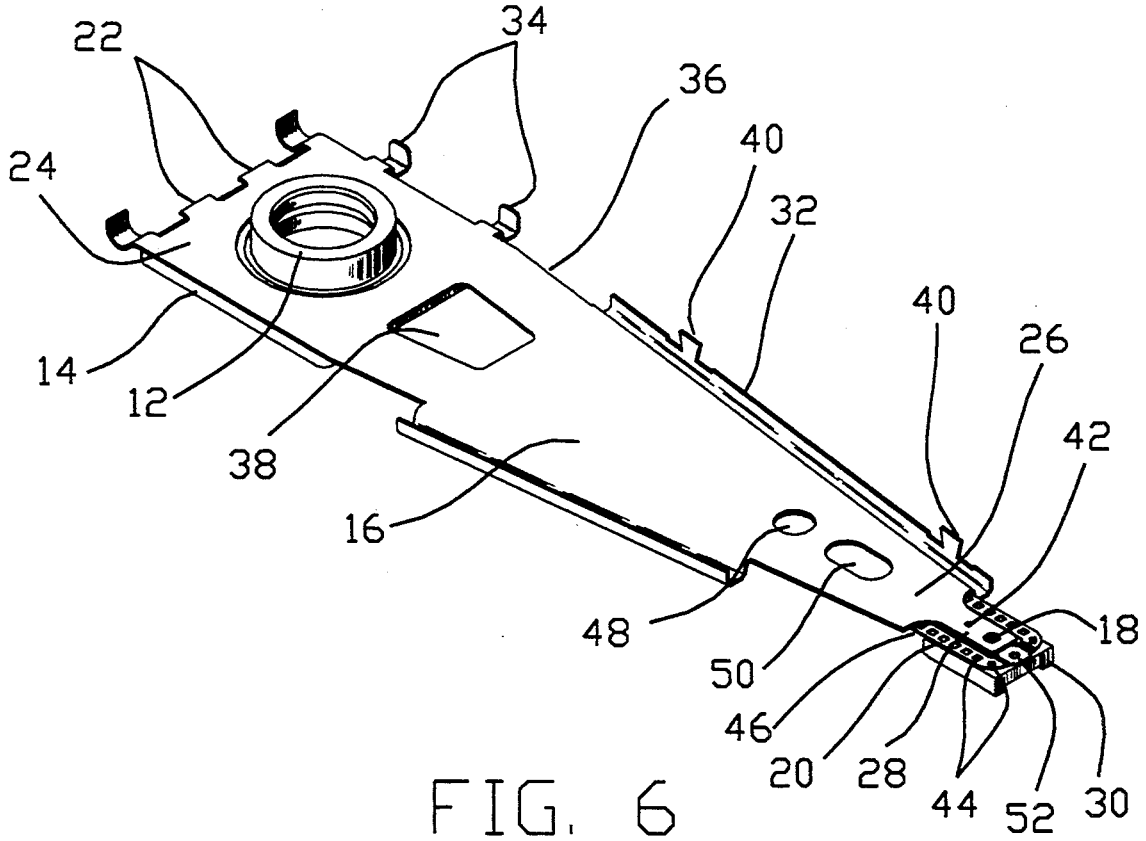
FIG. 6 is a perspective view of a head suspension assembly, similar to the partial view shown in FIG. 3.

As shown in FIGS. 3 and 3A, the flanges 32'' have a U-shaped cross-sectional profile and a maximum Z-axis depth measurement or maximum height of from about 0.25 to about 0.37 mm. Such flanges are suitable for supporting head interconnection means encased in protective tubing, generally having an overall diameter of about 0.23 to 0.38 mm. The flange 32'' closer to the disk hub is cut back, as shown in FIGS. 3 and 6, to further permit the head 30 to access disk tracks closer in to the disk hub. As shown in FIGS. 4 and 4A, the flanges 32'' have a V-shaped cross-sectional profile and a maximum Z-axis measurement or maximum height of about 0.20 to about 0.25 mm, suitable for supporting tubed or tubeless head interconnection means, generally having an overall diameter of about 0.025 to 0.23 mm.

Figure 5:
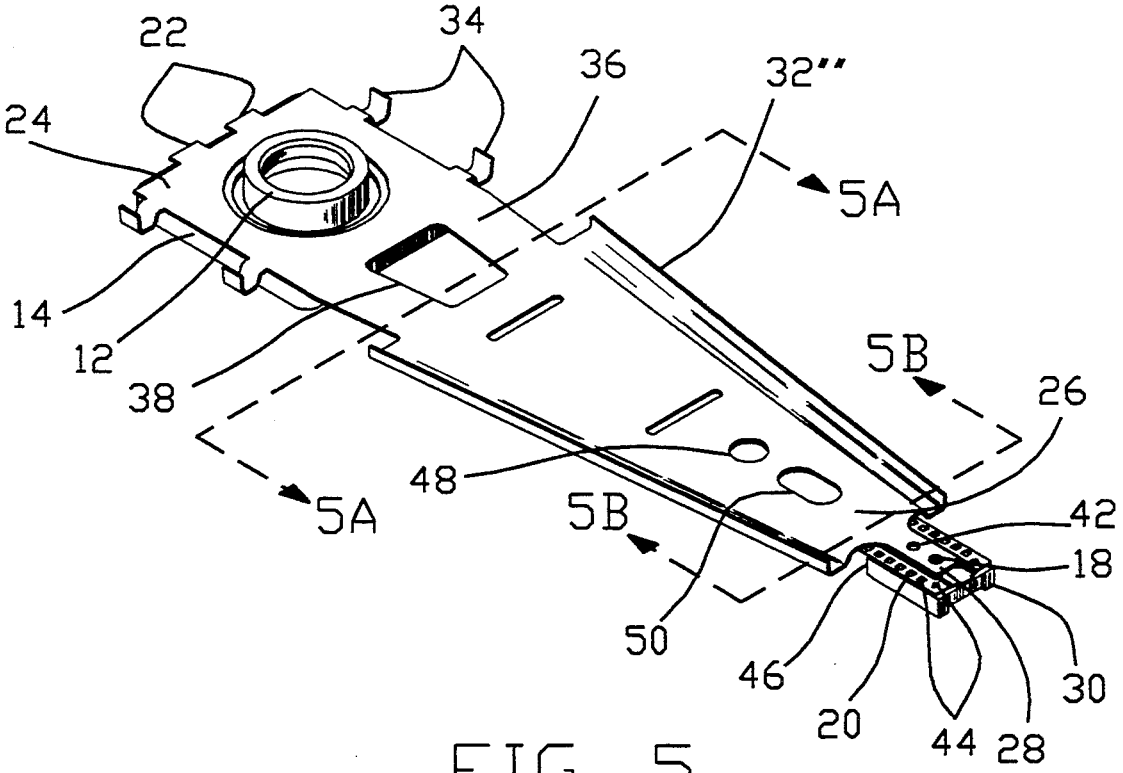
FIG. 5 is a perspective view of a head suspension assembly, similar to that shown in FIG. 1, showing transitional flanges, which taper from a minimum depth at a proximal end of the flanges to a maximum depth at a distal end of the flanges.
Figure 5A:
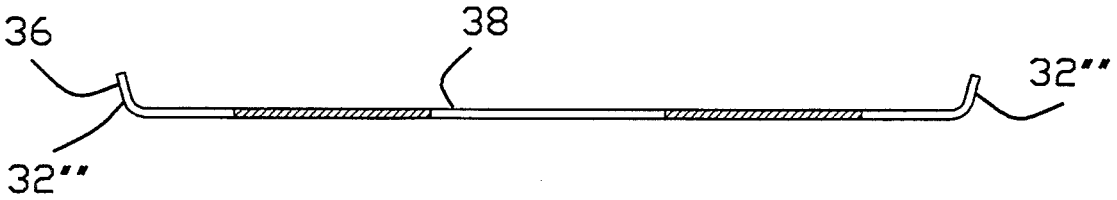
FIG. 5A shows a cross-sectional view, taken along line A—A of FIG. 5.
Figure 5B:
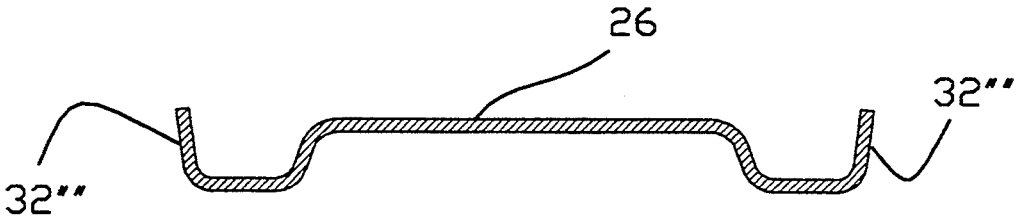
FIG. 5B shows a cross-sectional view, taken along line B—B of FIG. 5.

As illustrated in FIGS. 5, 5A, and 5B, the flanges 32'''' are of a transitional depth, having a minimum Z-axis measurement or height at a proximal end thereof (adjacent the load beam proximal end) and having a maximum Z-axis measurement or maximum height at a distal end thereof. Commonly assigned U.S. Pat. No. 5,198,945, issued Mar. 30, 1993, entitled MAGNETIC HEAD SUSPENSION, describes such transitional side rails or flanges, which provide increased loading clearance and increased disk to suspension clearance to facilitate lifting of the proximal end of the load beam. Such transitional flanges are advantageously used with the HSAs of the present invention. Flanges of either a U-shaped or a V-shaped profile may be formed as transitional depth flanges.

Figure 1A:
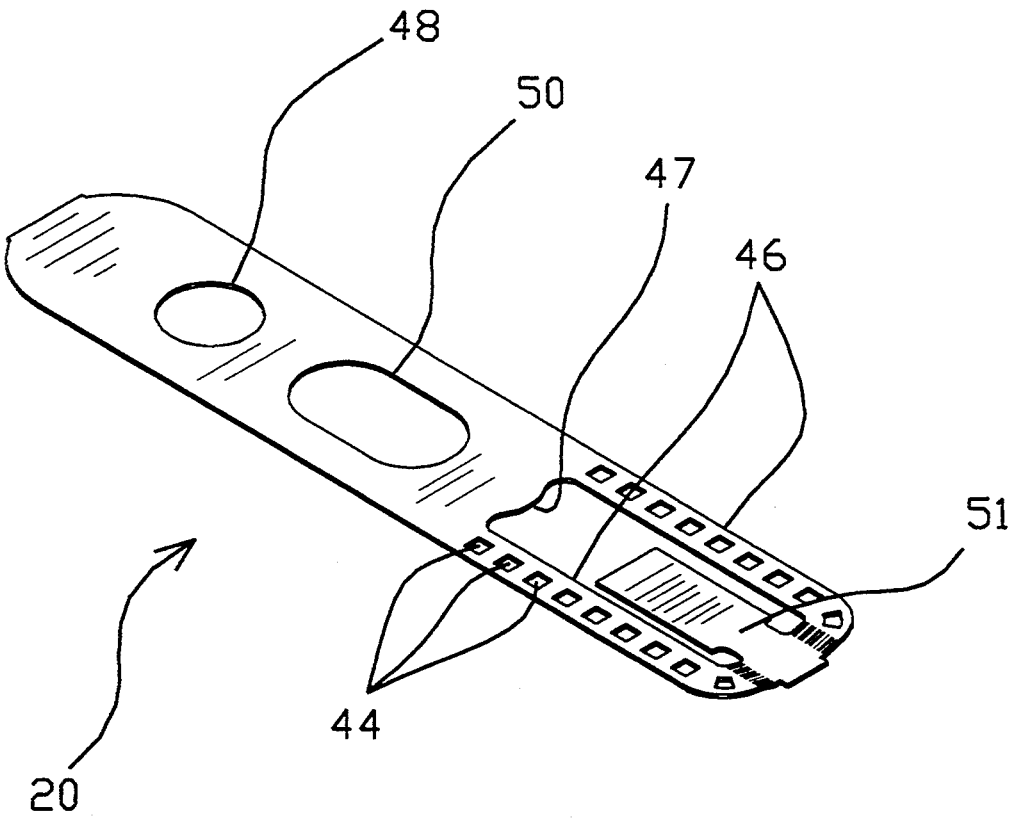
FIG. 1A is a perspective view of a flexure of FIG. 1.
Figure 7:
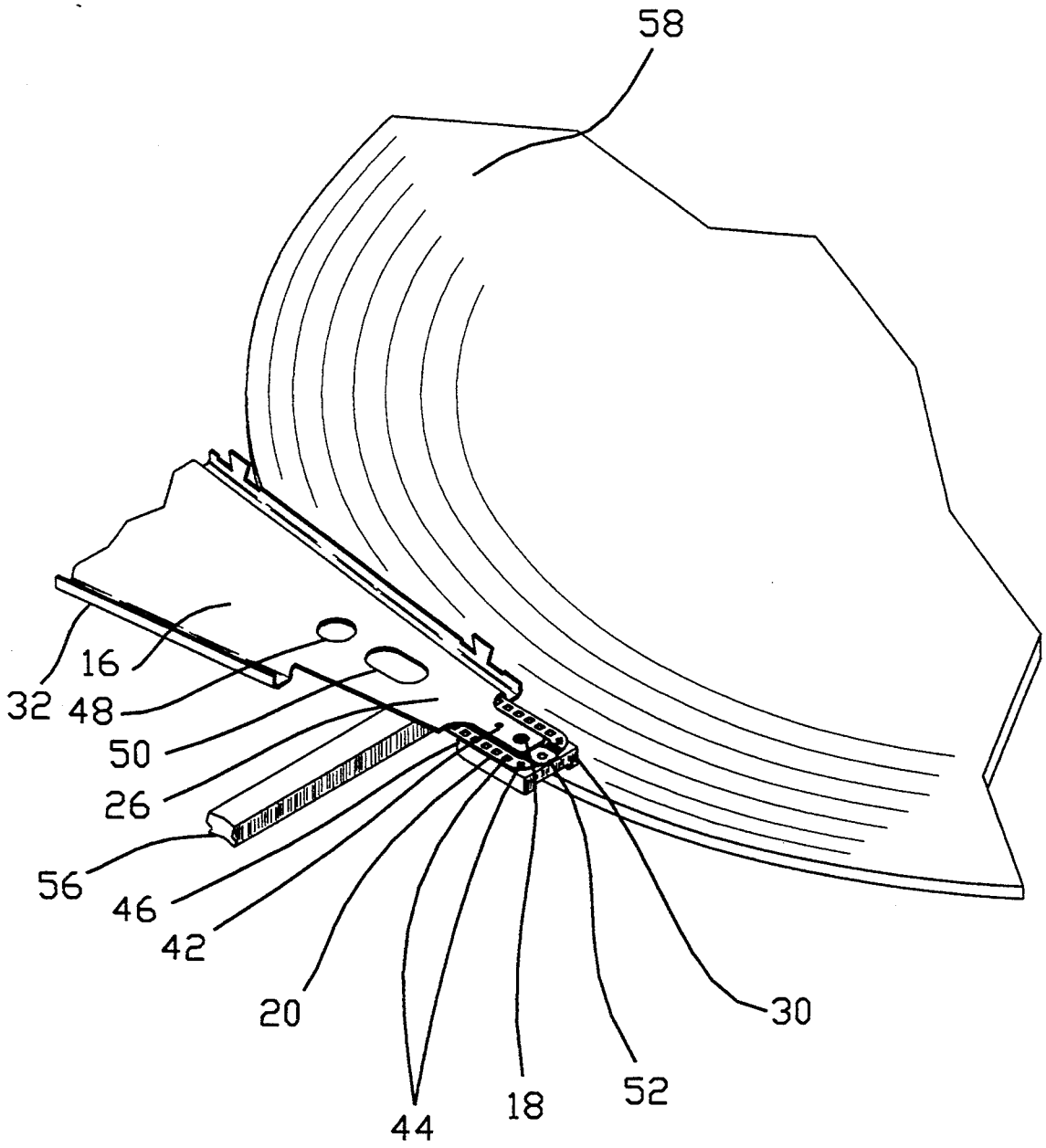
FIG. 7 is a perspective view of a head suspension assembly, similar to that shown in FIGS. 3 and 6, positioned in read/write relationship to a disk.

FIG. 6 shows another variation of the embodiments illustrated generally in FIGS. 1 and 1A. As has been described above, in FIG. 6, the distal end 26 of the flange 32 and an adjacent portion of the load beam 16 is cut away, to facilitate smaller head-to-hub distance. Alternatively, the flange opposite the disk 58 hub is cut away (as shown in FIG. 7) to allow increased clearance for lift and drive merge tooling 56. The lift tooling involves a series of ramps assembled to a common bar, so that the ramps can be wedged between the suspensions, when the suspensions have been assembled to an E-block (or when separate arms have been assembled into a stack). The purpose of wedging the ramps between the suspensions is to separate the head/sliders, and prevent the head/sliders from contacting each other during handling. The merge tooling is similar in concept, except that the merge tooling is used to keep the head/sliders separated, while they are positioned between the disks during the drive assembly process.

As shown in FIGS. 1, 1A, 2 and 2A and as discussed above, flexure 20, 20' is affixed to constricted nose 28, 28' at the distal end of load beam element 16, 16'. Constricted nose 28, 28' as has been discussed briefly, is provided with load bearing dimple 18, 18' and with aperture 42, 42' for ultraviolet curing of an epoxy adhesive used to bond flexure 20, 20' to load beam element 16, 16'.

Flexure 20, as best illustrated in FIG. 1A, includes central head mounting support means 51, to which a head is to be bonded and which is separated from the body of flexure 20 by cut-outs forming flexible arms 46. Central head mounting support means 51 is depressed from the level of the body of flexure by form lines 53 and 55. Flexible arms 46 connect, at the extreme distal end of flexure 20, to central head mounting support means 51. Flexure 20 has several through features 44 formed along the length of flexible arms 46. Through features 44 are areas of either complete or partial reduction in the thickness of the flexible arms 46, and are stamped, punched, etched, photolithographed, laser cut or otherwise formed in the surface of arms 46. The position, size and orientation of these through features 44 are selected to substantially reduce pitch and roll stiffness without greatly sacrificing lateral stiffness. Convex feature 47 also contributes to lateral stiffness of the flexure. Lateral stiffness affects access time and settling time when actuating the head from one disk track to another. Features 44 are generally rectangular and optionally have uniform spacing between them and optionally have similar dimensions. Typically, features 44 have dimensions ranging from 0.15 to 0.165 mm by 0.15 to 0.51 mm and a typical separation distance of 0.1 mm. Partial through features only cut through about ½ of the sheet material, which has a typical range of thickness of between 0.025 and 0.050 mm. Through features other than rectangular or alternative sizes and spacings are used and provide similar or even improved performance. Tooling hole 48 and tooling slot 50 cooperate with corresponding hole 48 and slot 50 on load beam 16 in aligning and connecting flexure 20 to load beam 16.

Figure 2A:
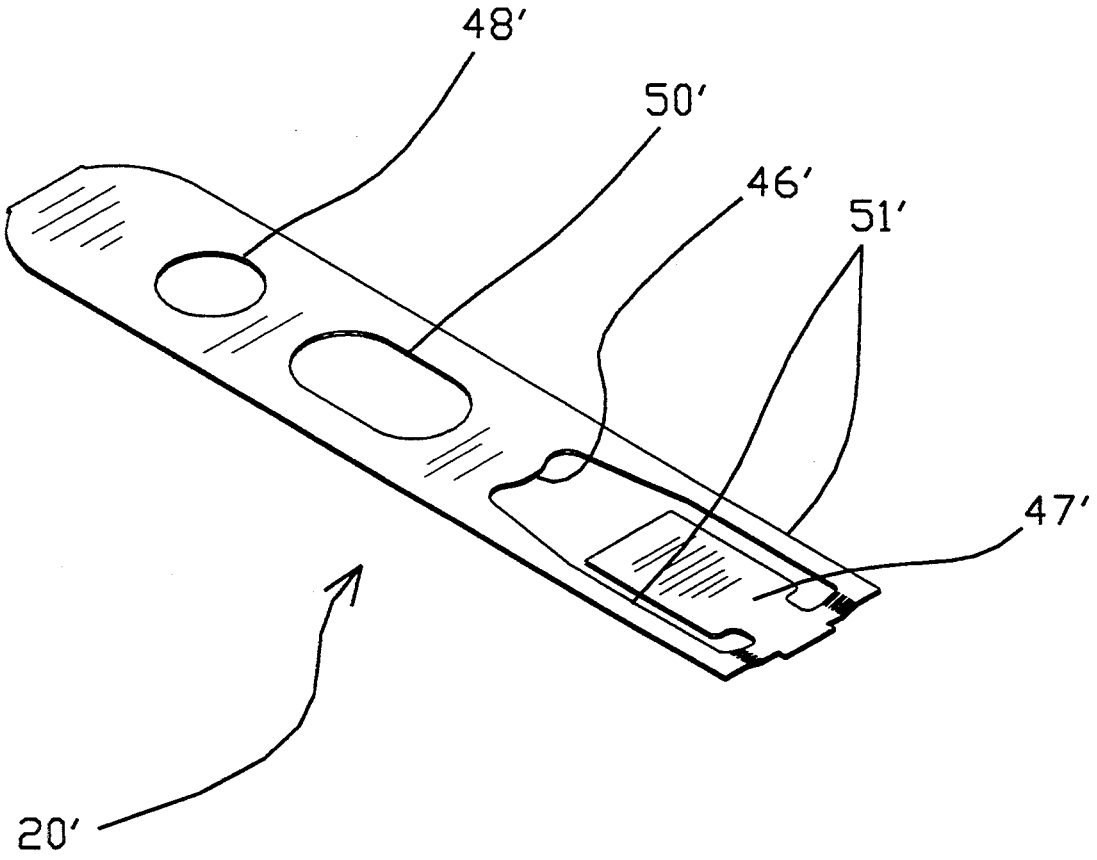
FIG. 2A ia a perspective view of a flexure of FIG. 2.

Flexure 20' as best illustrated in FIG. 2A, is shown provided with tooling hole 48' and tooling slot 50' to assist in location of flexure 20' to load beam 16' and in assembly of the suspension. Flexure 20' includes central head mounting support means 51', to which a head is to be bonded and which is separated from the body of flexure 20' by cut-outs forming flexible arms 46'. Central head mounting support means 51' is depressed from the level of the body of flexure by form lines 53' and 55'. Flexible arms 46' connect, at the extreme distal end of flexure 20', to central head mounting support means 51'. Each flexible arm 46', at the end thereof proximal to the rigid actuator arm has a widest width tapering to a narrowest width adjacent the central head mounting support means 51'. Convex feature 47' contributes to lateral stiffness of the flexure.

During manufacture and assembly of the suspension assembly according to the present invention, load beam 16, 16' is positioned relative to flexure 20, 20' by using tooling hole 48 and tooling slot 50, which are aligned with corresponding features 48, 50 on the flexure 20, 20'.

Alternatively, in any of the HSAs of the present invention, the mounting arm and the load beam may together be a unitary one-piece structure etched from the same sheet of material, so that the need for a separate actuator base plate is eliminated.

Significantly lower flexure gimballing stiffness for the present HSA allows decreased fly height variation by reducing torque against the air bearing due to manufacturing angular disparities. HSAs of the present invention are able to exert higher loads through the dimple/flexure interface onto the read/write head without affecting pitch and roll stiffness of the flexure. This is a completely unobvious result, since in previously available HSAs increasing load has had an adverse effect on flexure stiffness.

HSAs of this invention also have a high suspension offset capability. In previous HSAs, the load bearing dimple has conventionally been formed in the flexure. The height of the dimple has been limited by the thinness of the sheet material from which the flexure is made. Since the load beam is formed of a thicker sheet material than that used in forming the flexure, a dimple of greater height can now be formed in the load beam, resulting in higher suspension offset heights. Thus, HSAs of the present invention are able to fit into a larger range of disk drives of varying low to high disk spacings. Disk spacings as low as about 1.6 mm can be accommodated, and the present HSAs work most effectively in disk drives with Z-axis height tolerances of +/−0.25 mm.

Although the HSAs of the present invention are primarily designed for use in 50% slider disk drives, they can be formed with a high suspension offset height combined with a 50% slider. Thus, the combined Z-axis height is equal to that of a 70% slider and suspension, and the HSA of the present invention can then be retrofitted into a drive that previously used a 70% slider and suspension. The present HSAs are compatible with most rigid disk drives of between about 30 to 90 mm. Generally, HSAs of the present invention have a medium length load beam of about 18.03 mm (measured from the center of the swage boss to the center of the load dimple), although load beam lengths of between about 10.1 to about 30.5 mm can suitably be used.

HSAs prepared in accordance with the teachings of this invention meet the performance requirements of 50% sliders, including improved frequency response, more accurate slider positioning and minimized flying variation. In addition, the presently provided HSAs are able to accommodate specific applications requiring the ability to withstand low to moderate operating shock, where lateral stiffness is not a key requirement. The present HSAs demonstrate higher resonance frequencies and minimal flying variation, while accommodating a wide range of Z-axis heights. The design of the present novel HSAs is especially suitable for use in disk drives having minimal disk spacings, and can be compatible with rigid disk drives of various sizes.

It is to be understood that either a standard flexure 20' (such as shown in FIGS. 2, 2A and 4) or a laterally stiff flexure 20 (such as shown in FIGS. 1, 1A, 3, 5, 6 and 7) may be used with any of the load beams as described herein. The standard flexure 20' (as illustrated in FIG. 4) and the laterally stiff flexure 20 (as illustrated in FIG. 3, 6 and 7) may be provided an aperture 52, 52' which may be used for ultraviolet irradiation of adhesive bonding head 30 to flexure 20, 20'. The reverse flanges, as described previously, are able to allow for very tight disk spacing, and can be from about 0.2 to about 0.25 mm for V-profile flanges (such as shown in FIGS. 4 and 4A) and about 0.4 mm for U-profile flanges (such as shown in FIGS. 3 and 3A). Nominal loads can range from about 30 to about 70 mN, with a load tolerance of +/−3 mN. Static pitch and roll of the head bond area can be held to +/−45 min. Typical spring rate of the HSA, that is, load change of the head due to Z-height changes, is 18 N/m. The flexure has a pitch stiffness of between about 1.5 to about 2.0 μN·m/deg, a roll stiffness of between about 2.0 to about 2.5 μN·m/deg, and a lateral stiffness of between about 4.7 to about 12.5 μN·m/deg.

The present HSAs have controlled first and second torsion amplitudes, which prevent unacceptable off-track error in a typical application. Sway mode is the first mode to cause off-track motion for rotary actuation with a frequency typically above 8000 Hz. Using a basic ramping configuration, an HSA of the present invention can be lifted vertically approximately 100,000 times beyond nominal Z-height with no visible cracks in the flexure, with lifting done at a tooling hole 5.33 mm from flexure center an the head being lifted vertically 0.4 mm from the disk surface. An HSA of the present invention withstand half sine shocks of 500 G's for 3 msec in vertical and lateral directions.

What is claimed is:

1. A head suspension assembly for attachment to a rigid actuator arm and for supporting a read/write head, said head suspension assembly comprising, in combination:

a load beam having a proximal end, a distal end, a first surface, a second opposing surface, stiffening flanges projecting from longitudinal edges of the load beam, and a load bearing dimple at the distal end, the proximal end joined to the rigid arm, the stiffening flanges having a maximum depth of about 0.4 mm from the first surface, and the flanges terminating co-extensive with the second opposing surface of the load beam, each flange tapering from a minimum depth at a proximal end thereof adjacent the load beam proximal end to the maximum depth at a distal end thereof, and the dimple having a minimum height of about 0.1 mm from the first surface; and a flexure means attached at the distal end of the first surface of the load beam and interfacing with the dimple.

2. A head suspension assembly according to claim 1, adapted and arranged to operably support loads through a dimple/flexure interface onto the read/write head ranging from about 30 mN to about 70 mN.

3. A head suspension assembly according to claim 1, wherein a width of the distal end of the load beam element is less than a width of the flexure, thereby allowing gimballing of the flexure arms to be unobstructed by the load beam.

4. A head suspension assembly according to claim 1, wherein a portion of the load beam adjacent the proximal end of the load beam is provided with a support means for read-write head connection means along a longitudinal edge of the load beam.

5. A head suspension assembly according to claim 4, wherein the support means is a longitudinal bracket.

6. A head suspension assembly according to claim 4, wherein the support means is one or more supporting tabs.

7. A head suspension assembly according to claim 1, wherein a spring region of the load beam element is provided with an area of reduced thickness therein.

8. A head suspension assembly according to claim 1, wherein the load beam is provided with tooling features to facilitate accurate angular placement in suspension alignment, slider bonding alignment and alignment of the load beam to the rigid arm.

9. A head suspension assembly according to claim 8, wherein a tooling feature for alignment of the load beam to the rigid arm is one or more proximally extending tabs at a proximal end of the load beam.

10. A head suspension assembly according to claim 8, wherein a tooling feature for suspension alignment or slider bonding alignment is one or more apertures in the load beam element.

11. A head suspension assembly according to claim 1, wherein the flexure and an actuator base plate are each welded to the load beam.

12. A head suspension assembly according to claim 1, wherein each flange has a U-shaped cross-sectional profile and the maximum depth of from about 0.25 to about 0.37 mm.

13. A head suspension assembly according to claim 1, wherein each flange has a V-shaped cross-sectional profile and the maximum depth of about 0.25 mm, suitable for supporting either tubed or tubeless read/write head interconnection means.

14. A head suspension assembly according to claim 1, in which the flanges are provided with extending tabs to provide further support to read/write interconnection means.

15. A head suspension assembly according to claim 1, wherein areas of reduced thickness are provided on the flexure.

16. A head suspension assembly according to claim 1, wherein a length of the load beam from a center of an actuator boss to a center of the load dimple is between about 17.8 to 18.3 mm.

17. A head suspension assembly according to claim 1, wherein one flange terminates at a point proximal of the distal end of the load beam to facilitate a smaller head-to-hub distance or to allow increased clearance for lift and drive merge tooling.

18. A head suspension assembly according to claim 17, wherein the flexure and an actuator base plate are each attached to the load beam by weldment.

19. A head suspension assembly for attachment to a rigid arm, said head suspension assembly comprising, in combination:

a load beam having a proximal end, a distal end, stiffening flanges projecting from longitudinal edges of the load beam, a first surface, a second opposing surface, a spring region adjacent the proximal end, the spring region having an area of reduced thickness, tooling features located adjacent the proximal end and located just proximal of the distal end, and a load beam dimple at the distal end, the proximal end joined to the rigid arm, the flanges having a maximum depth of about 0.4 mm from the first surface, the flanges terminating co-extensive with the second opposing surface, each flange having a depth of 0 at a proximal end thereof adjacent the load beam proximal end and the maximum depth at a distal end of each flange, the dimple having a minimum height of about 0.1 mm from the first surface, the distal end of the load beam having a width less than a width of the flexure attached thereto, the proximal end of the load having a support means for supporting read/write head interconnection means along a longitudinal edge thereof; and the flexure means attached to the distal end of the first surface of the load beam and interfacing with the dimple.

20. A head suspension assembly according to claim 19, wherein the tooling feature in the proximal end of the load beam is a pair of tooling tabs.

21. A head suspension assembly according to claim 19, wherein tooling features in the distal end of the load beam are tooling apertures.

22. A head suspension assembly according to claim 19, wherein each flange has a U-shaped cross-sectional profile and a maximum depth of from about 0.25 to about 0.37 mm.

23. A head suspension assembly according to claim 19, wherein each flange has a V-shaped cross-sectional profile and a maximum depth of about 0.25 mm, suitable for supporting either tubed or tubeless read/write head interconnection means.

24. A head suspension assembly according to claim 19, wherein a flange is cut back to facilitate a smaller head-to-hub distance or to allow increased clearance for lift and drive merge tooling.

* * * * *